United States Patent [19]
Dore et al.

[11] Patent Number: 5,842,688
[45] Date of Patent: Dec. 1, 1998

[54] ARRANGEMENT FOR DAMPING THROUGH WIRE-DRAWING OF A FLUID AND SUSPENSION SYSTEM IN PARTICULAR OF AN AUTOMOTIVE VEHICLE FITTED WITH SUCH A DAMPING ARRANGEMENT

[75] Inventors: Jacques Dore, Colombes; Alain Oustaloup; Michel Nouillant, both of Talence; Xavier Moreau, Coutras, all of France

[73] Assignee: Automobiles Peugeot-Automobiles Citroen, Paris, France

[21] Appl. No.: 638,695

[22] Filed: Apr. 26, 1996

[30] Foreign Application Priority Data

Apr. 27, 1995 [FR] France ................................... 95 05084

[51] Int. Cl.⁶ ..................................................... F16F 5/00
[52] U.S. Cl. ................................. 267/140.14; 188/266.2; 188/283; 280/707; 280/708
[58] Field of Search ......................... 267/140.14, 140.15; 188/266.2, 283; 248/575, 636; 280/708, 714, 707

[56] References Cited

U.S. PATENT DOCUMENTS

| | | | |
|---|---|---|---|
| 2,061,068 | 11/1936 | Fuchs | 188/87 |
| 3,827,538 | 8/1974 | Morgan | 188/319 |
| 4,709,779 | 12/1987 | Takehara | 267/140.14 X |
| 4,877,225 | 10/1989 | Noguchi et al. | 267/140.14 |

FOREIGN PATENT DOCUMENTS

| | | |
|---|---|---|
| 0346040 | 12/1989 | European Pat. Off. . |
| 1242350 | 8/1960 | France . |
| 3340153 | 8/1984 | Germany ......................... 267/140.14 |
| 3316025 | 11/1984 | Germany . |
| 4022099 | 12/1991 | Germany . |
| 9210834 | 11/1992 | Germany . |
| 36-57032 | 4/1985 | Japan ............................. 267/140.14 |
| 8909891 | 10/1989 | WIPO . |
| 9212359 | 7/1992 | WIPO . |

OTHER PUBLICATIONS

Patent Abstracts of Japan, vol. 7, No. 12, Jan. 19, 1983, JP-A-57-171133, Oct. 21, 1982, "Hydraulic Buffer".

Patent Abstracts of Japan, vol. 6, No. 249, Dec. 8, 1982, JP-A-57-146933, Sep. 10, 1982, "Vibration Absorbing Device".

Patent Abstracts of Japan, vol. 9, No. 268, Oct. 25, 1985, JP-A-60-113832, Jun. 20, 1985, "Mounting Device of Power Unit".

*Primary Examiner*—Peter M. Poon
*Attorney, Agent, or Firm*—Steinberg & Raskin, P.C.

[57] ABSTRACT

An arrangement for damping movement of a mass with respect to a support to which the mass is connected by a suspension device. The suspension device is provided with one or more springs and a hydraulic damping system through which a hydraulic fluid flows. One or more devices are present for wire-drawing this fluid through a respective aperture. Each wire-drawing device is arranged to continuously vary the damping characteristics by controlling the extent of opening of the aperture(s) and thus regulate the flow of the fluid through the hydraulic damping system.

19 Claims, 3 Drawing Sheets

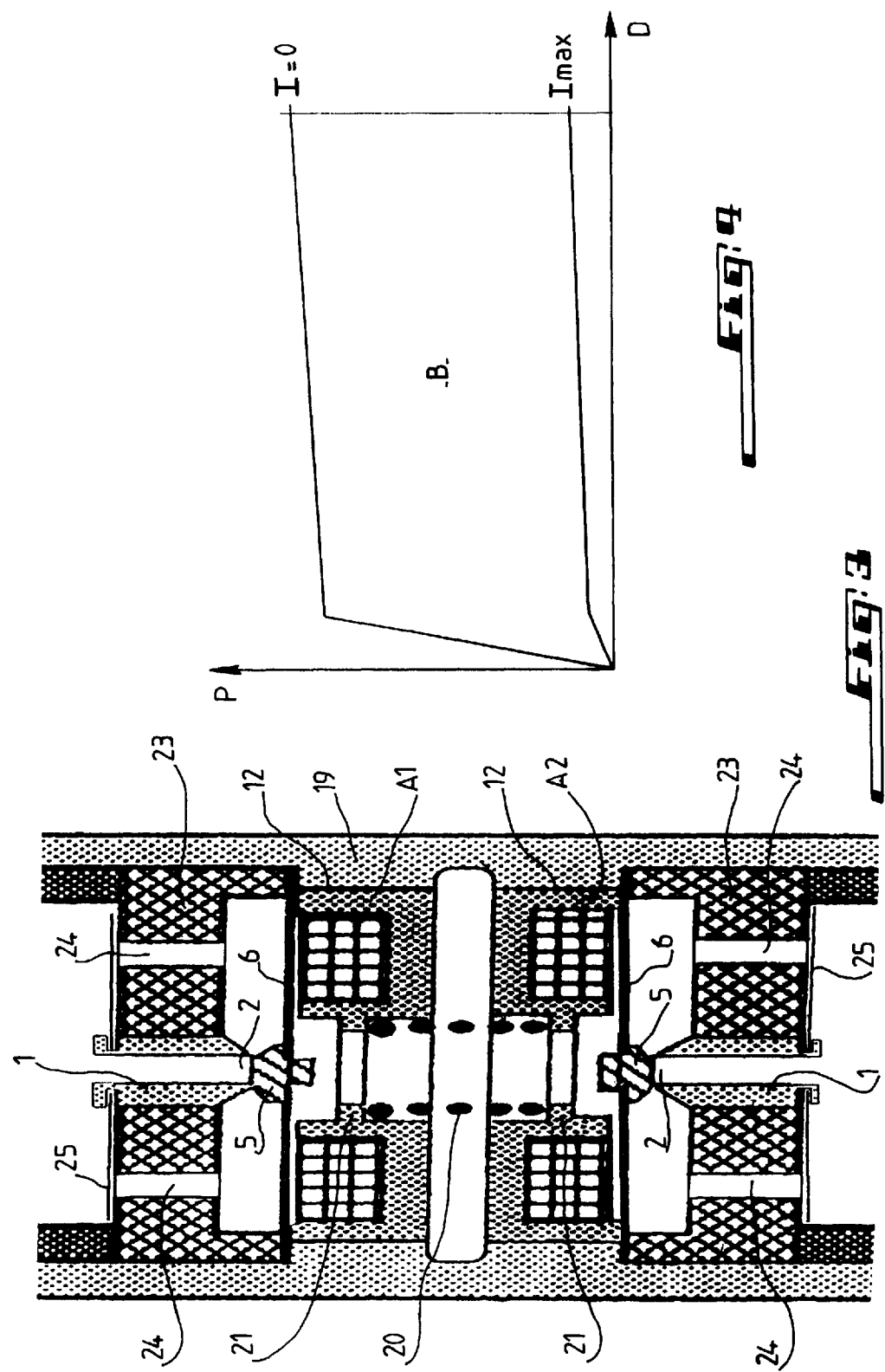

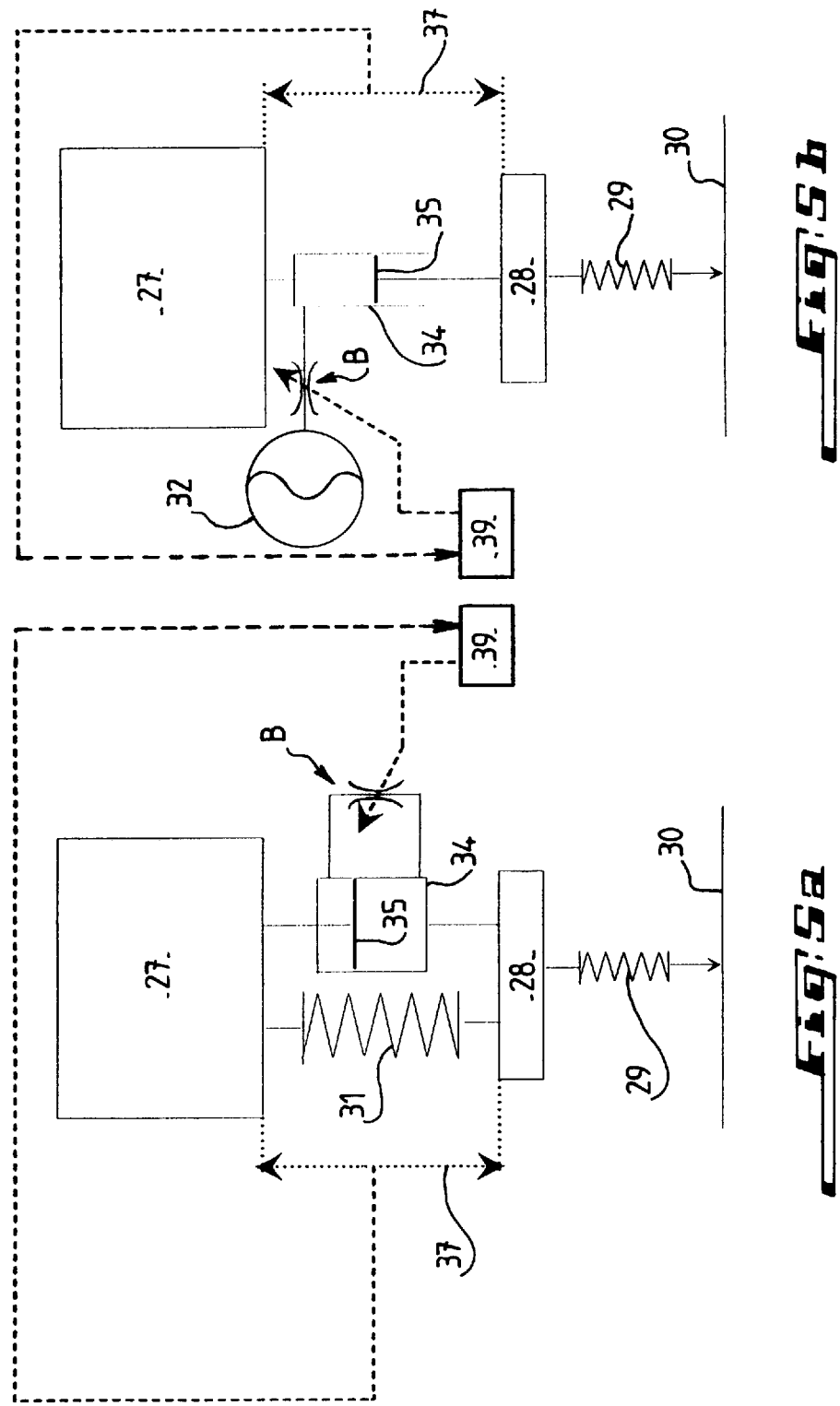

5,842,688

ARRANGEMENT FOR DAMPING THROUGH WIRE-DRAWING OF A FLUID AND SUSPENSION SYSTEM IN PARTICULAR OF AN AUTOMOTIVE VEHICLE FITTED WITH SUCH A DAMPING ARRANGEMENT

FIELD OF THE INVENTION

The invention relates to an arrangement for damping movements of a mass with respect to a support to which it is connected through the medium of a suspension device provided with at least one spring and with hydraulic damping means of the type setting the hydraulic fluid moving and comprising at least one device for wire-drawing or throttling this fluid by at least one aperture through which the fluid is caused to flow and to a suspension system in particular for an automotive vehicle fitted with such a damping arrangement.

BACKGROUND OF THE INVENTION

It is known that the filtration of the movements accomplished by a suspension is all the more better as the stiffness of the springs of this device and the force generated by the dampers are weaker. On the contrary small values of the stiffness of the springs and of the damping force may result in some cases in undesirable motions of the mass which have a great amplitude. Taking into account the predictable values of the motion of the mass, there is an optimum value of the stiffness and of the damping of the suspension.

In the known hydraulic damping arrangements where the hydraulic fluid is set moving by a piston and wire-drawn or throttled by the passage into the said aperture, the fluid flow rate is directly proportional to the speed of the piston and the head or pressure loss between the upstream and downstream sides of the wire-drawing device determines the force acting upon the piston. The adjustment or control of the law governing the flow rate versus the head or pressure loss therefore determines the law governing the speed versus the force of the damper. This law is of primary importance since it characterizes the effect of the damper.

The known damping arrangements exhibit the major inconvenience that they only permit to obtain one single law governing the force versus the speed. It should be adapted to avoid the too large movements of the mass during the most violent actions upon its support. Owing to this fact during small actions upon the support, the filtration is not optimum since in this case the damping forces could be reduced.

In view of the foregoing, there has been provided dampers with two and even three discrete laws obtained by the obturation or non-obturation of additional calibrated apertures or restrictions.

The arrangements thus improved however still exhibit the inconvenience of being not continuously variable and of having a bulky or cumbersome structure.

OBJECTS AND SUMMARY OF THE INVENTION

The object of the present invention is to provide a damping arrangement which does not exhibit the inconveniences of the known dampers which have just been set forth.

To achieve this purpose, the arrangement for damping through wire-drawing of a fluid according to the invention is characterized in that the wire-drawing device comprises means for the continuous variation of the damping characteristics by the control of the extent of opening of the aperture.

According to one characterizing feature of the invention, the means for continuously varying the damping characteristics comprise at least one flexible plate forming a diaphragm, arranged in perpendicular relation to the aperture and carrying a valve member of which the force applying it upon the aperture is variable and means for the control of the variation of this force.

Since the damping characteristics are continuously variable, the arrangement according to the invention may provide at any time the force governing law exactly adapted to the amplitude of the actions and therefore allows to continuously obtain the best possible filtration of the movements between the support and the suspended mass.

According to one characterizing feature of the invention, the means for the control of the variation of the force applying the valve member upon the aperture comprise an electro-magnet and the plate is made from a magnetic material and disposed in the magnetic field of the electro-magnet so as to modify the applying force under the effect of the force generated by the latter.

According to another characterizing feature of the invention, the plate is elastically urged or biassed towards the aperture.

According to another characterizing feature, the plate is fitted or set with its edges into a support structure so as to be deformable towards the aperture.

According to still another characterizing feature of the invention, the damping device comprises two devices for the continuous variation of the damping characteristics, which are mounted in head-to-foot relationship in a support body, each device being provided with means ensuring a unidirectional fluid flow.

The suspension system in particular of a wheel of an automotive vehicle is characterized in that the damping arrangement according to the invention is associated with the hydraulic circuit provided between the vehicle body forming the suspended mass and the support consisting of the wheel and of one portion of the axle.

BRIEF DESCRIPTION OF THE DRAWINGS

The invention will be better understood and further objects, characterizing features, details and advantages thereof will appear more clearly in the following explanatory description made with reference to the accompanying diagrammatic drawings given by way of example only illustrating a presently preferred specific embodiment of the invention and wherein:

FIG. 3 is a diagrammatic view in section of a damping arrangement provided with two devices for varying the damping characteristics according to the invention mounted in head-to-foot relationship and being each one for a unidirectional fluid flow;

FIG. 4 illustrates a diagram or plot of the operating range of the damping arrangement according to the present invention; and FIGS. 5a and 5b diagrammatically illustrate the application of the damping arrangement according to the invention to two versions of suspension of a wheel of an automotive vehicle.

DETAILED DESCRIPTION OF THE PREFERRED EMBODIMENTS

Figure 1:
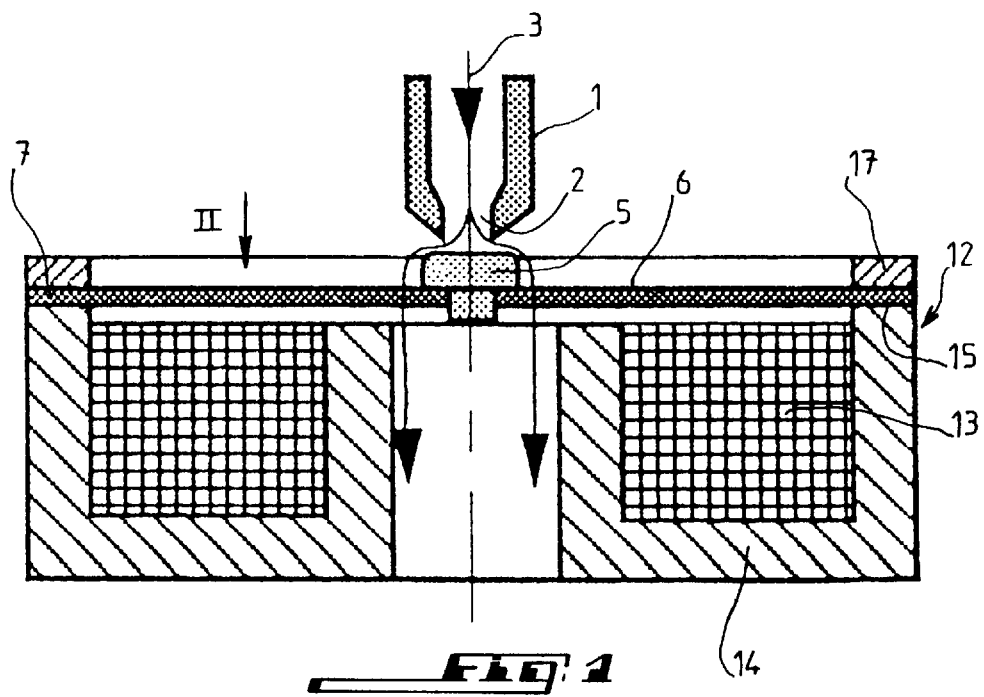
FIG. 1 is a diagrammatic view in section of a damping arrangement according to the present invention.
Figure 2:
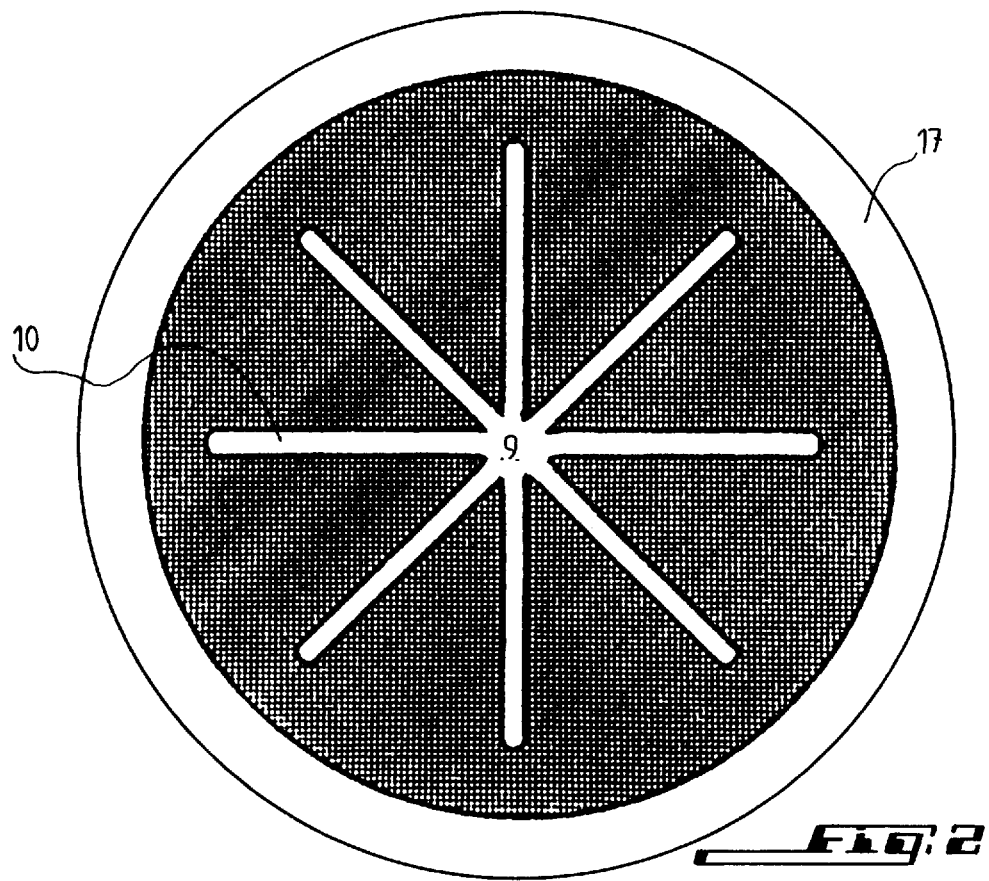
FIG. 2 is a top view of a plate for varying the damping characteristics as viewed according to the arrow II of FIG. 1.

Referring to FIG. 1, there is seen that an arrangement for damping, through wire-drawing of a fluid, of the movements of a mass with respect to a support to which this mass is connected through the medium of a suspension device, comprises a nozzle 1 through the hole or port 2 of which is supplied or arrives the flow rate of the fluid to be wire-drawn 3, and a valve member 5 placed at the center of a stack of a flexible plates 6 forming a diaphragm. The plates are made from a magnetic material, exhibit a circular shape and extend in perpendicular relation to the axis of the hole. The plates are fitted or set at their peripheral area 7 into a suitable support. The valve member 5 is placed in front of the port 2 of the nozzle 1 and the setting of the plates 6 is such that the valve member is pressed at rest upon the nozzle with a certain force for closing the aperture 2. The stack of plates 6 comprises a central hole 9 for the positioning of the valve member and a certain number of radial grooves or slots 10 which extend from the central hole to some distance from the periphery of the plates. These grooves or slots provide the flexibility to the whole assembly of plates 6 and permit the passage through the latter of the fluid after its having been wire-drawn at the outlet of the nozzle aperture 2 as this is illustrated by arrows.

An annular electro-magnet 12 consisting of a winding or coil 13 and of a casing 14 is disposed in coaxial relation to the plates 6 on the side opposite to the nozzle 1 at a predetermined axial distance to permit an axial displacement of the central portion carrying the valve member 5, of the plates under the effect of the fluid jet arriving in the nozzle 1. The electro-magnet 12 by pulling the plates varies the force of applying the valve member 5 upon the aperture 2 of the nozzle. At a same flow rate, the pressure generated upstream of the aperture will be all the more weaker as the pull of the electro-magnet is higher. It is seen that the stack of plates 6 is fitted or set between the radially outer periphery 15 of the casing 14 and the annular element 17 fastened onto this peripheral edge.

It is easily understood that the number and the thickness of the plates 6 is selected in accordance with the flexibility of the stack which is desired to be provided. The force of pressing the valve member 5 upon the nozzle 1 results from the initial force provided by the stack and decreased by the pulling force generated by the electro-magnet when it is energized.

It is thus possible to modulate the effect of the wire-drawing of the fluid 3 flowing through the nozzle by modulating the current fed into the coil 13 of the electro-magnet.

FIG. 3 shows a damping arrangement comprising two wire-drawing devices according to FIG. 1 which are arranged in head-to-foot relationship in a support body or frame 19. The wire-drawing devices carry the reference characters A1 and A2. The component elements of the wire-drawing devices which are common to FIGS. 1 and 3 carry the same reference characters.

In the arrangement according to FIG. 3, the electro-magnets 12 of both devices A1 and A2 are mounted in freely slidable relationship in the body or frame 19. A helical spring 20 is interposed between both devices while bearing upon two internal flanges or shoulders 21 of the casings. Each nozzle is coaxially mounted in a support element 23 itself fastened coaxially in the body 19. A number of axial ducts 24 are axially extending through each support element. A thin diaphragm 25 of circular shape formed with a central hole drilled therethrough permitting the passage of the nozzle and the fastening of the latter is fastened onto the front surface of each support element 23 so as to close the axial ducts 24. Each diaphragm 25 performs the function of a check valve. A very low pressure originating from one duct 24 is sufficient to lift the valve member 25. On the contrary a pressure acting upon the other face of the diaphragm, i.e. the outside face, would press the diaphragm upon the support element 23 and compel the liquid to pass through the nozzle 1.

Owing to this arrangement, each wire-drawing device A1 and A2 operates only in one single direction of flow of the fluid, the flow taking place freely in the other direction through the axial ducts 24.

By controlling the electric currents in the coils or windings 13 of the wire-drawing devices A1 and A2, it is therefore possible to control in each direction of flow, the head or pressure low in accordance with the flow rate throughout an operating range as shown on FIG. 4. This figure shows the operating range B between a coil energizing current I=O and a maximum current $I_{max}$, the axes of abscissae and of ordinates represent the flow rate D of the fluid and the pressure P, respectively.

To achieve a good efficiency or effectiveness of the arrangement under normal operating conditions, the possible stroke of the stack of plates 6 is small. In case of accidental overpressure, the diaphragm formed of the stack of plates 6 is caused to engage or contact the casing 14 of the associated electro-magnet and causes the latter to slide in the body 19 while compressing the spring 20. The passage of fluid is freed or released, i.e. the passageway is disengaged. The small inertia of the diaphragm 6 and of the valve member 5 provides a response of this member to a high frequency for example above 100 Hz.

It is easily understood that an electronic computer receiving suitable signals may continuously control the currents energizing the electro-magnets 12 and thus provide the desired head or pressure loss in the damping arrangement.

FIGS. 5a and 5b illustrate by way of example the use of an arrangement according to the invention for the damping of an automotive vehicle suspension with another spring and with a pneumatic spring, respectively.

The figures diagrammatically show the suspension of a wheel of an automotive vehicle. On the figures, the reference numerals 27 and 28 designate the suspended mass, i.e. the body of the vehicle and the non-suspended mass, formed of the wheel and of one part of the axle, respectively. The element 29 symbolizes the pneumatic appliance interposed between the mass 28 and the ground 30. The suspension system consisting of a metal spring 31 on FIG. 5a and of a pneumatic spring 32 on FIG. 5b, and of a liquid displacement system 34 the piston of which is designated at 35, is interposed between the suspended mass 27 and the non-suspended mass 28.

In the suspension with a metal spring of FIG. 5a, the damping arrangement B for example according to FIG. 3 is diagrammatically shown to be outside of the system 34. It could however also be integrated into the piston 35.

In the suspension with a pneumatic spring 32 of FIG. 5b, the damping arrangement B is inserted in the hydraulic circuit between the spring 32 and the cylinder of the system 34.

In the application illustrated on FIGS. 5a and 5b, the damping arrangement according to the invention is used for the damping of the relative movements of the non-suspended mass 28 and of the vehicle body constituting the suspended mass 27, due to the unevenness of the ground 30. A displacement sensor symbolically designated at 37 permanently measures the elongation of the suspension spring 31 or 32 and provides the measurement values to a computer 39 which determines at each time the optimum value of the damping force so as on the one hand to better filter the transmission to the body 27 of the forces generated by the motions of the wheels due to the unevenness of the ground 30 and on the other hand to ensure that the force of contact of the pneumatic appliance with the ground be maximum in order to provide for the road behaviour of the vehicle.

The calculation of the damping force should be carried out for example according to the CRONE ("Robust Control of Non-Whole Number Order") law according to which the force is either zero or proportional to a time-derivative of real non-integer order of the length of the suspension spring. This law is disclosed in the French patent publication No. 2,660,386 which is herein included by reference.

It should be pointed out that the damping arrangement according to the invention may be used in any other system for the suspension of a mass in which a liquid is set moving and wire-drawn to generate a damping force, for example the suspension of a piston engine on the body of an automotive vehicle where are used rubber supports separated or divided into two chambers filled with fluid, the motions of the engine causing the passage of the fluid from one chamber to the other one. This fluid flow rate may be controlled by the arrangement such as described hereinabove and shown on the figures.

The use of one plate or of a stack of thin plates as a diaphragm is particularly advantageous since this permits to have a very small mass and therefore a small inertia and a very quick response frequency. It is possible to very quickly vary the rate of damping and this is particularly interesting in the case of the application to an automotive vehicle suspension since it is possible to practically instantaneously match the riding conditions through practically instantaneous adaptation of the system thereto. The use of a stack of thin plates is preferable since such a stack is more easily deformable than one single plate the thickness of which would be equal to that of the stack.

What is claimed is:

1. An arrangement for damping movements of a mass with respect to a support, comprising a suspension device for connecting the mass to the support, said suspension device including at least one spring and hydraulic damping means for damping movement of the mass with respect to the support, said hydraulic damping means being arranged to allow a flow of a hydraulic fluid therethrough and including at least one wire-drawing device for regulating the flow of the fluid, said at least one wire-drawing device defining an aperture through which the fluid flows and including a valve member movable between a position in which said valve member closes said aperture and positions in which said aperture is open against a force urging said valve member to close said aperture, at least one plate forming a diaphragm, said valve member being carried on said at least one plate, said at least one plate being arranged perpendicular to said aperture and displaceable between a position in which said valve member closes said aperture and positions in which said aperture is open, and control means for controlling the extent of opening of said aperture by said valve member to thereby enable continuous adjustability of the damping characteristics of said hydraulic damping means, said control means being arranged to control displacement of said at least one plate.

2. An arrangement according to claim 1, wherein said at least one plate comprises several flexible plates stacked upon each other.

3. An arrangement according to claim 1, comprising two wire-drawing variation devices mounted in head-to-foot relationship in a support body, each device being provided as a device with a unidirectional fluid flow.

4. An arrangement according to claim 3, wherein each device comprises a nozzle with a nozzle-holding support body formed with passageway ducts parallel to the duct of the nozzle and with which is associated said diaphragm for preventing a fluid flow through said ducts in the same direction as the fluid flow through the said nozzle.

5. An arrangement according to claim 3, wherein said devices are mounted in head-to-foot relationship in said support so as to be axially movable against a spring interposed between both devices.

6. An arrangement according to claim 1, wherein the damping force is determined according to a law of the CRONE kind.

7. A suspension system in particular for an automotive vehicle of the type with at least one spring and with a liquid displacement system advantageously with a piston which are mounted between the body of the vehicle and the support formed of the wheel and of one part of the axle, wherein the improvement consists in that a damping arrangement according to claim 1 is associated with said liquid displacement system.

8. A suspension system of the type with a metal spring according to claim 7, wherein said damping arrangement is mounted onto said liquid displacement system and integrated into the piston of the latter.

9. A suspension system of the type with a pneumatic spring according to claim 7, wherein said damping arrangement is inserted into the hydraulic circuit between said pneumatic spring and the cylinder of said liquid displacement system.

10. An arrangement according to claim 1, wherein each of said at least one plate is prestressed so as to be elastically urged toward said aperture.

11. An arrangement according to claim 1, wherein each of said at least one plate is flexible and set with its edges into a support structure so as to be elastically deformable towards said aperture and to permit the passage of the fluid through said plate.

12. An arrangement according to claim 1, wherein each of said at least one plate comprises radial elongated openings providing the flexibility to said plate and permitting the passage of the fluid flowing out of said aperture.

13. An arrangement according to claim 1, wherein each of said at least one plate includes a central hole and said valve member is inserted through said central hole of said plate and retained therein.

14. An arrangement for damping movements of a mass with respect to a support, comprising a suspension device for connecting the mass to the support, said suspension device including at least one spring and hydraulic damping means for damping movement of the mass with respect to the support, said hydraulic damping means being arranged to allow a flow of a hydraulic fluid therethrough and including at least one wire-drawing device for regulating the flow of the fluid, said at least one wire-drawing device defining an aperture through which the fluid flows and including a valve member movable between a position in which said valve member closes said aperture and positions in which said aperture is open against a force urging said valve member to close said aperture, at least one plate forming a diaphragm, said valve member being carried on said at least one plate, said at least one plate being arranged perpendicular to said aperture and displaceable between a position in which said valve member closes said aperture and positions in which said aperture is open, and control means for controlling the extent of opening of said aperture by said valve member to thereby enable continuous adjustability of the damping characteristics of said hydraulic damping means, said control means being arranged to control displacement of said at least one plate, said control means comprising at least one electro-magnet, said at least one plate being made from a magnetic material and disposed within the magnetic field of said at least one electro-magnet such that the force urging said valve member to close said aperture is adjusted under the effect of the force generated by said at least one electro-magnet.

15. An arrangement according to claim 14, wherein each of said at least one plate is prestressed so as to be elastically urged toward the aperture.

16. An arrangement according to claim 15, wherein each of said at least one plate is flexible and set with its edges into a support structure so as to be elastically deformable towards said aperture and to permit the passage of the fluid through said plate.

17. An arrangement according to claim 16, wherein each of said at least one plate comprises radial elongated openings providing the flexibility to said plate and permitting the passage of the fluid flowing out of said aperture.

18. An arrangement according to claim 14, wherein said at least one plate comprises several flexible plates stacked upon each other.

19. An arrangement according to claim 14, wherein each of said at least one plate includes a central hole and said valve member is inserted through said central hole of said plate and retained therein.

* * * * *